US010661837B2

(12) United States Patent
Madsen et al.

(10) Patent No.: US 10,661,837 B2
(45) Date of Patent: May 26, 2020

(54) DOOR HINGE STANDOFF STRUCTURE

(71) Applicant: Honda Motor Co., Ltd., Tokyo (JP)

(72) Inventors: Aron K. Madsen, Marysville, OH (US); Carolyn A. LeBlanc, Marysville, OH (US); Joseph M. Riggsby, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 279 days.

(21) Appl. No.: 15/474,126

(22) Filed: Mar. 30, 2017

(65) Prior Publication Data
US 2018/0281866 A1    Oct. 4, 2018

(51) Int. Cl.
B62D 25/04    (2006.01)
B62D 27/06    (2006.01)
B62D 27/02    (2006.01)
E05D 5/06     (2006.01)

(52) U.S. Cl.
CPC ............ *B62D 25/04* (2013.01); *B62D 27/02* (2013.01); *B62D 27/065* (2013.01); *E05D 5/062* (2013.01); *E05Y 2900/531* (2013.01)

(58) Field of Classification Search
CPC ...... B62D 25/04; B62D 27/02; B62D 27/065; E05D 5/062; E05Y 2900/531
See application file for complete search history.

(56) References Cited

U.S. PATENT DOCUMENTS

| 2,327,585 | A | * | 8/1943 | Ulrich | B62D 21/09 280/797 |
| 5,269,584 | A | * | 12/1993 | Takagi | B62D 21/09 16/2.1 |
| 5,561,887 | A | * | 10/1996 | Neag | E05D 3/127 16/334 |
| 5,624,150 | A |   | 4/1997 | Venier | |
| 5,653,496 | A | * | 8/1997 | Mori | B60J 3/0217 296/187.05 |
| 5,676,510 | A | * | 10/1997 | Fischer | B60J 5/0431 411/104 |

(Continued)

FOREIGN PATENT DOCUMENTS

CN    1307983 A    8/2001
CN    1177710 C    12/2004
(Continued)

*Primary Examiner* — Hilary L Gutman
(74) *Attorney, Agent, or Firm* — Honda Patents & Technologies North America, LLC; Mark E. Duell

(57) ABSTRACT

A system for attaching a door to the body of a vehicle includes an inner pillar stiffener, an outer pillar stiffener laterally outward from the inner pillar stiffener, and an outer panel laterally outward from the outer panel stiffener. The system has a standoff structure located between the outer pillar stiffener and the outer panel, a door hinge, hinge bolts for fastening the door hinge to the standoff structure, the hinge bolts received through holes in the outer panel, the holes in the standoff structure, the holes in the outer pillar stiffener, and plate nuts for securing the hinge bolts to the outer pillar stiffener. The standoff structure includes a cup-shaped body having a bottom portion, a sidewall portion, and an edge, a flange extending around the edge of the cup-shaped body, holes in the cup-shaped body, and weld collars extending inward from the holes to the outer pillar stiffener.

22 Claims, 14 Drawing Sheets

(56) References Cited

U.S. PATENT DOCUMENTS

| | | | |
|---|---|---|---|
| 6,158,086 A * | 12/2000 | De Souza | E05D 7/04 16/237 |
| 6,267,437 B1 | 7/2001 | Morsch et al. | |
| 6,698,821 B2 * | 3/2004 | Racz | E05D 7/04 16/254 |
| 6,719,354 B2 | 4/2004 | Holt | |
| 6,942,277 B2 * | 9/2005 | Rangnekar | E05D 3/127 16/366 |
| 7,032,953 B2 | 4/2006 | Rangnekar et al. | |
| 7,188,884 B2 * | 3/2007 | Praznik | B62D 25/12 296/146.11 |
| 7,201,398 B1 * | 4/2007 | Christofaro | B62D 21/02 180/312 |
| 8,007,025 B2 | 8/2011 | Kohr et al. | |
| 8,591,158 B2 * | 11/2013 | Diehl | F16B 5/02 411/103 |
| 9,555,836 B2 * | 1/2017 | Yamamoto | B62D 25/025 |
| 9,758,998 B2 * | 9/2017 | Mildner | B60J 5/0431 |
| 2009/0152896 A1 * | 6/2009 | Enderich | B62D 25/00 296/187.03 |
| 2016/0082814 A1 | 3/2016 | Mori et al. | |
| 2016/0123057 A1 | 5/2016 | Mildner et al. | |
| 2019/0176890 A1 * | 6/2019 | Han | B62D 24/00 |

FOREIGN PATENT DOCUMENTS

| | | | | |
|---|---|---|---|---|
| CN | 204645919 U | 9/2015 | | |
| DE | 102006058109 A1 | 6/2008 | | |
| DE | 112015000178 B4 * | 11/2019 | | B62D 25/025 |
| JP | 2001151152 A | 6/2001 | | |
| KR | 20080053430 A | 6/2008 | | |

* cited by examiner

SECTION C-C

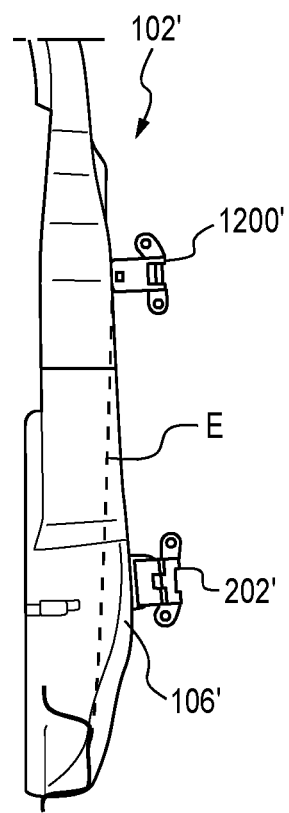 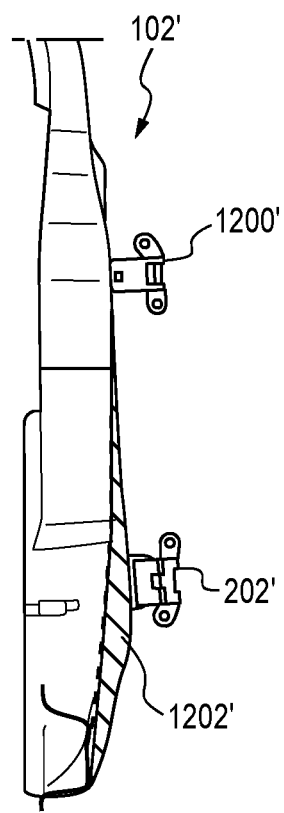
FIG. 12B
(PRIOR ART)
FIG. 12C
(PRIOR ART)

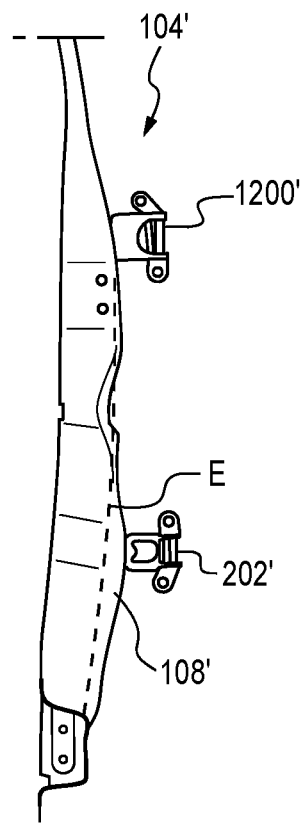 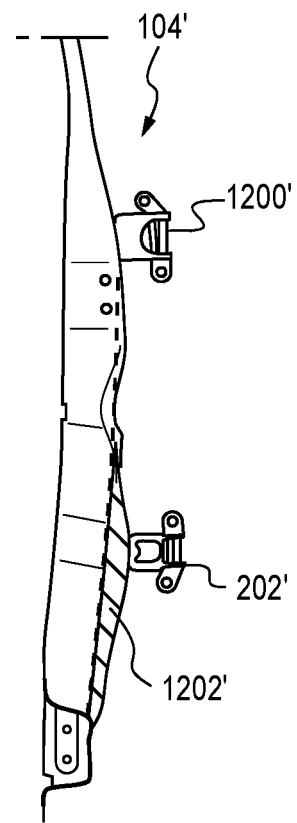
FIG. 12D
(PRIOR ART)
FIG. 12E
(PRIOR ART)

DOOR HINGE STANDOFF STRUCTURE

TECHNICAL FIELD

The embodiment disclosed herein are related to systems and methods for attaching doors to the body of a vehicle.

BACKGROUND

Vehicle door hinges are bolted directly to the white body structure. This structure is typically a panel stack up of an outer side panel, an outer stiffener, and a reinforcement stiffener with weld nuts. Current body structures use formed shapes in the outer stiffener to mate up to the outer side panel. The reinforcement is typically a bulkhead or doubling patch used to increase thickness locally and connect the sides of the outer stiffener.

When using common platforms with varying styling, situations have arisen where the platform design is narrow with wide styling. This situation can cause hard to form geometry in the outer stiffener and add unnecessary material and pillar width since the stiffener needs to be line on line with the side panel. Adding geometry that makes the outer stiffeners meet up to the side panel can also lead to a varying cross-section of the side sill, which is preferred to stay consistent.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a system for attaching a door to the body of a vehicle is disclosed. The body has an inner pillar stiffener, an outer pillar stiffener laterally outward from the inner pillar stiffener, and an outer panel laterally outward from the outer panel stiffener. The system includes a standoff structure located between the outer pillar stiffener and the outer panel, a door hinge, a first fastener for fastening the door hinge to the standoff structure, the first fastener received through first hole in the outer panel, the first hole in the standoff structure, and the first hole in the outer pillar stiffener, and a first plate nut for securing the first fastener to the outer pillar stiffener. The standoff structure includes a cup-shaped body having a bottom portion, a sidewall portion, and an edge, a flange extending around the edge of the cup-shaped body, a first hole in the bottom portion of the cup-shaped body, a first weld collar extending laterally inward from the first hole to the outer pillar stiffener, the first weld collar concentric with the first hole in the standoff structure, a first hole in the outer pillar stiffener, and a first hole in the outer panel.

According to another aspect, a standoff structure located between an outer pillar stiffener and an outer panel located laterally outward from the outer pillar stiffener, to which a door hinge is attached, includes a cup-shaped body having a bottom portion, a sidewall portion, and an edge, a flange extending around the edge of the cup-shaped body, a first hole in the bottom portion of the cup-shaped body, and a first weld collar extending laterally inward from the first hole to the outer pillar stiffener, the first weld collar concentric with the first hole in the standoff structure, a first hole in the outer pillar stiffener, and a first hole in the outer panel.

According to yet another aspect, a method of assembling a door of a motor vehicle includes the steps of installing an outer pillar stiffener to a pillar of the motor vehicle, assembling a standoff structure, installing the standoff structure to the outer pillar stiffener of the motor vehicle, installing an outer side panel to the pillar of the motor vehicle, attaching a door hinge to the outer side panel and the standoff structure, and attaching the door to the door hinge.

BRIEF DESCRIPTION OF THE DRAWINGS

FIG. 12B is a front profile view of a front pillar of the prior art vehicle shown in FIG. 12A.

FIG. 12C is a front profile view of the front pillar of the prior art vehicle shown in FIG. 12A showing required excess material.

FIG. 12D is a front profile view of a center pillar of the prior art vehicle shown in FIG. 12A.

FIG. 12E is a front profile view of the center pillar of the prior art vehicle shown in FIG. 12A showing required excess material.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
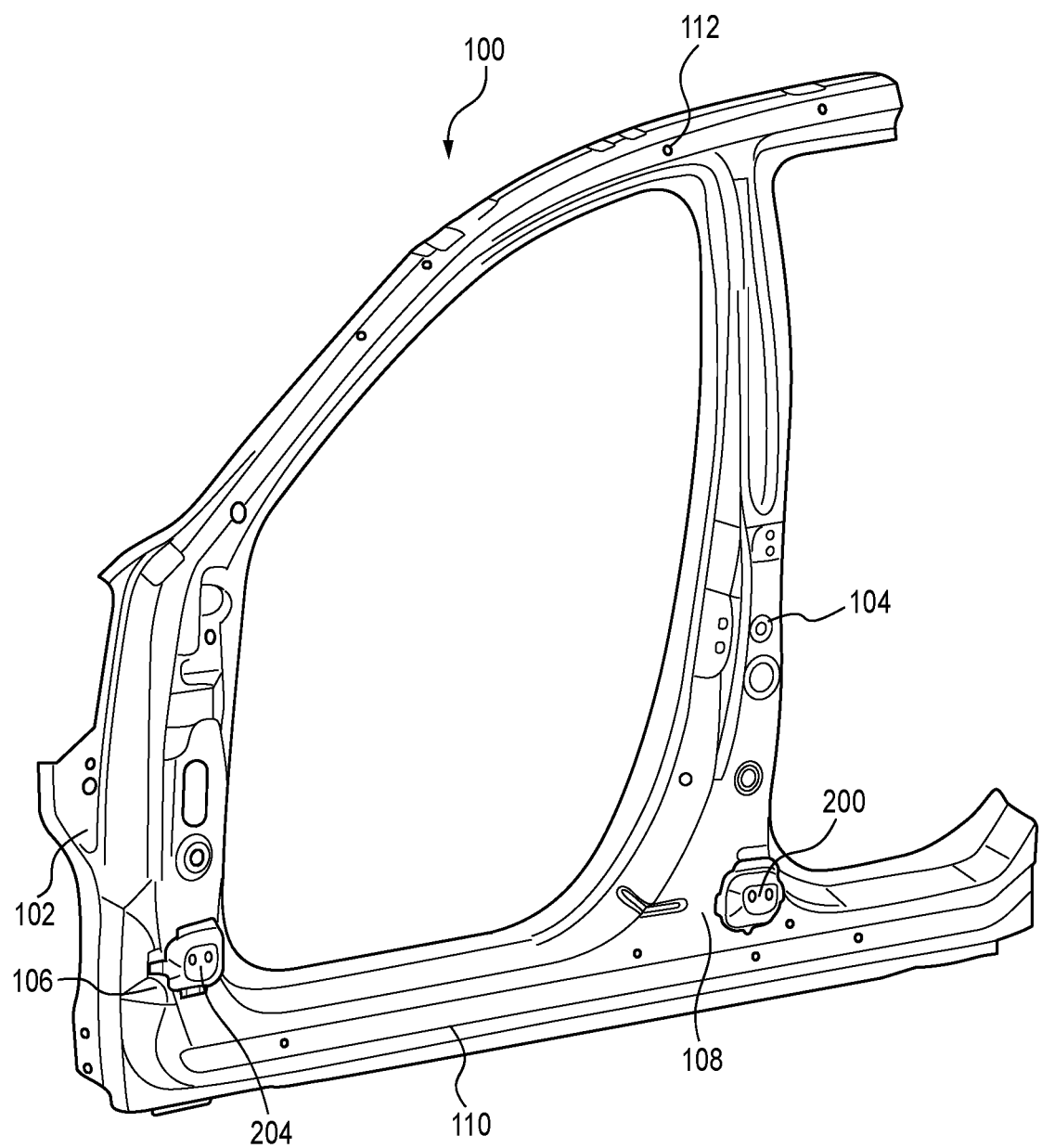
FIG. 1 is a side perspective view of a door ring of a vehicle.

FIG. 1 illustrates a door ring 100 of a typical four-doored sedan-type, sports-utility-type, or crossover-type vehicle.

The door ring 100 includes a longitudinally forward front pillar 102, often called an A-pillar, and a longitudinally rearward center pillar 104, often called a B-pillar. Each of the pillars 102, 104 features an outer pillar stiffener 106, 108, or section, for providing structural rigidity to each of the pillars. Each pillar also includes an inner pillar stiffener, which is shown for the center pillar in FIG. 4 and discussed in further detail below. The pillars 102, 104 are connected by a side sill 110, and an upper roof member 112.

Figure 2:
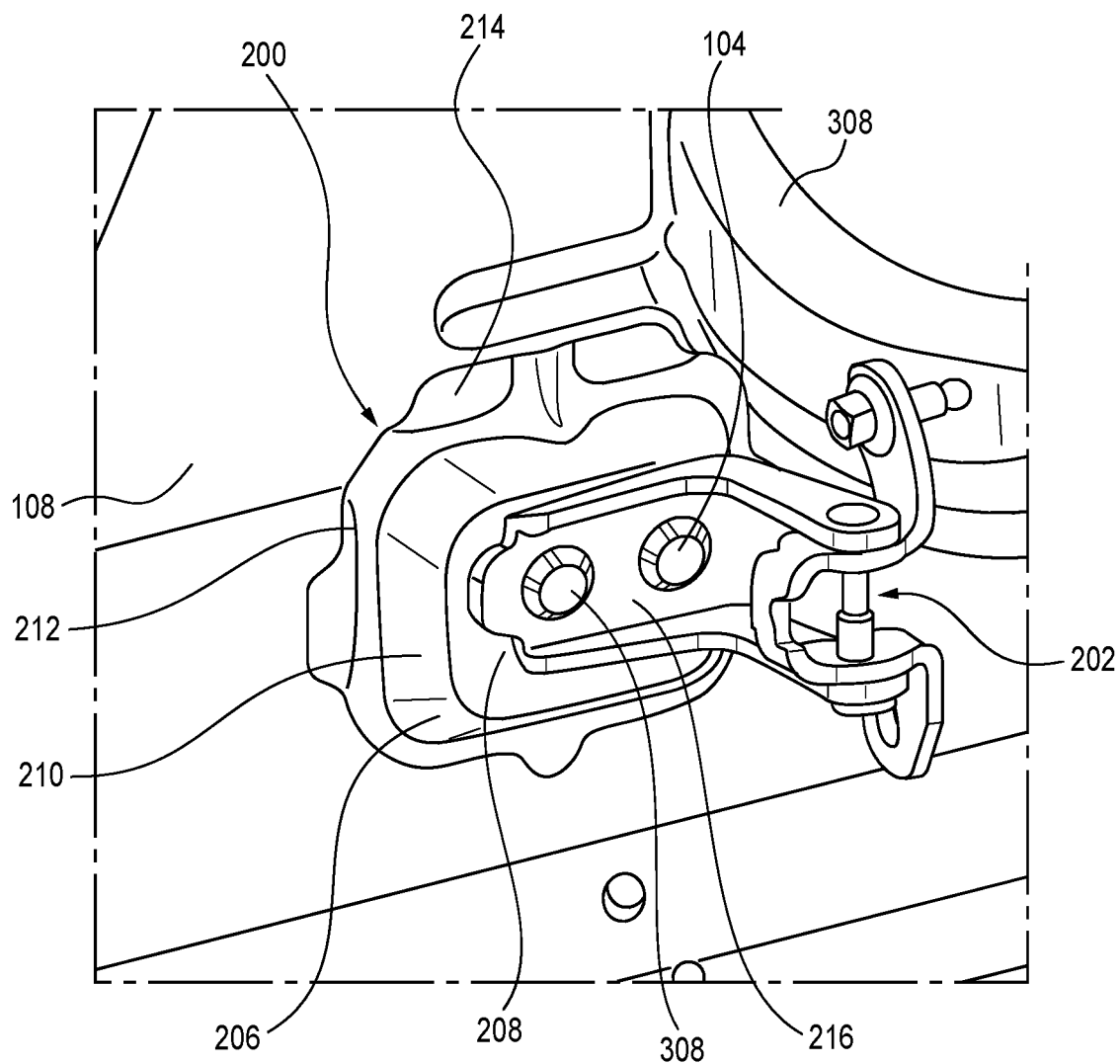
FIG. 2 is a perspective view of a door standoff structure and door hinge.

With continuing reference to FIG. 1, each pillar 102, 104 includes a standoff structure 200, 204, to which a door hinge 202 is attached. FIG. 2 shows a close-up view of the standoff structure 200 associated with the center pillar 104 and the attached door hinge 202, which in turn is an attachment point for the rear or second row door of the motor vehicle (not shown). The standoff structure 204 associated with the front pillar 102, shown in FIG. 1, is the attachment point for a door hinge 202 related to the front or first row door of the motor vehicle (not shown).

Figure 3:
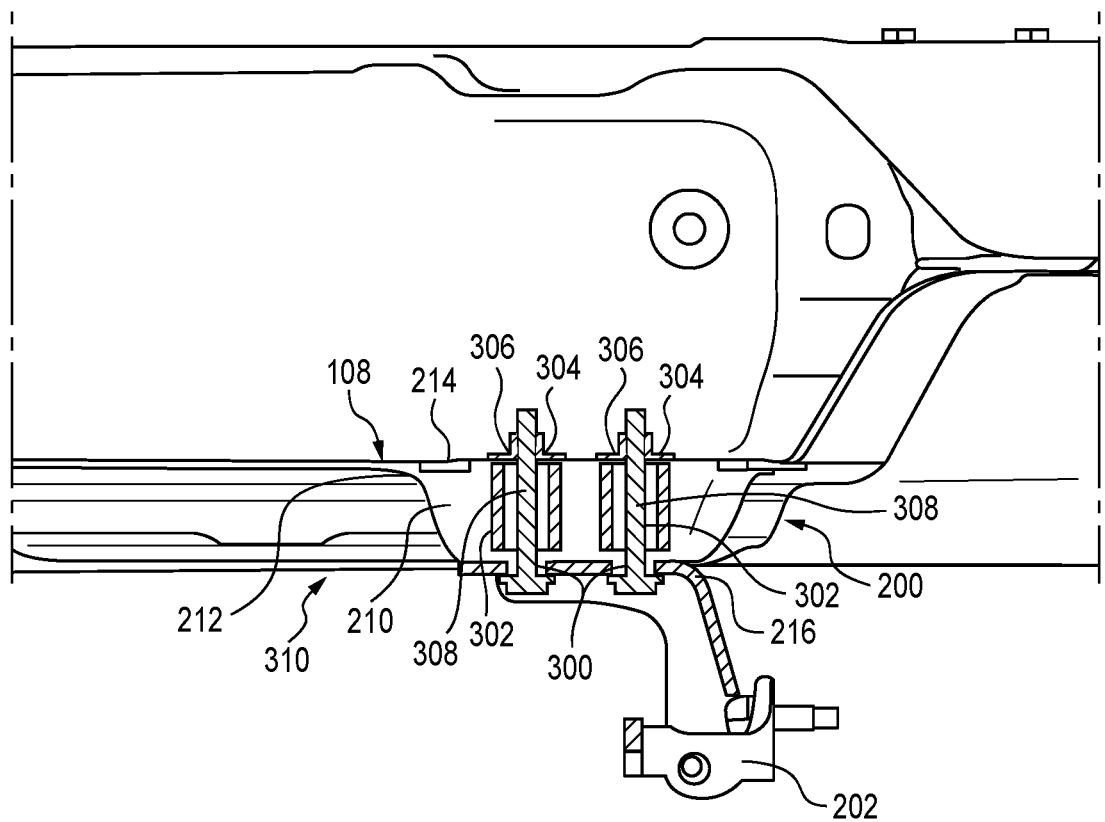
FIG. 3 is a cross-section taken along line A-A of FIG. 2.
Figure 4:
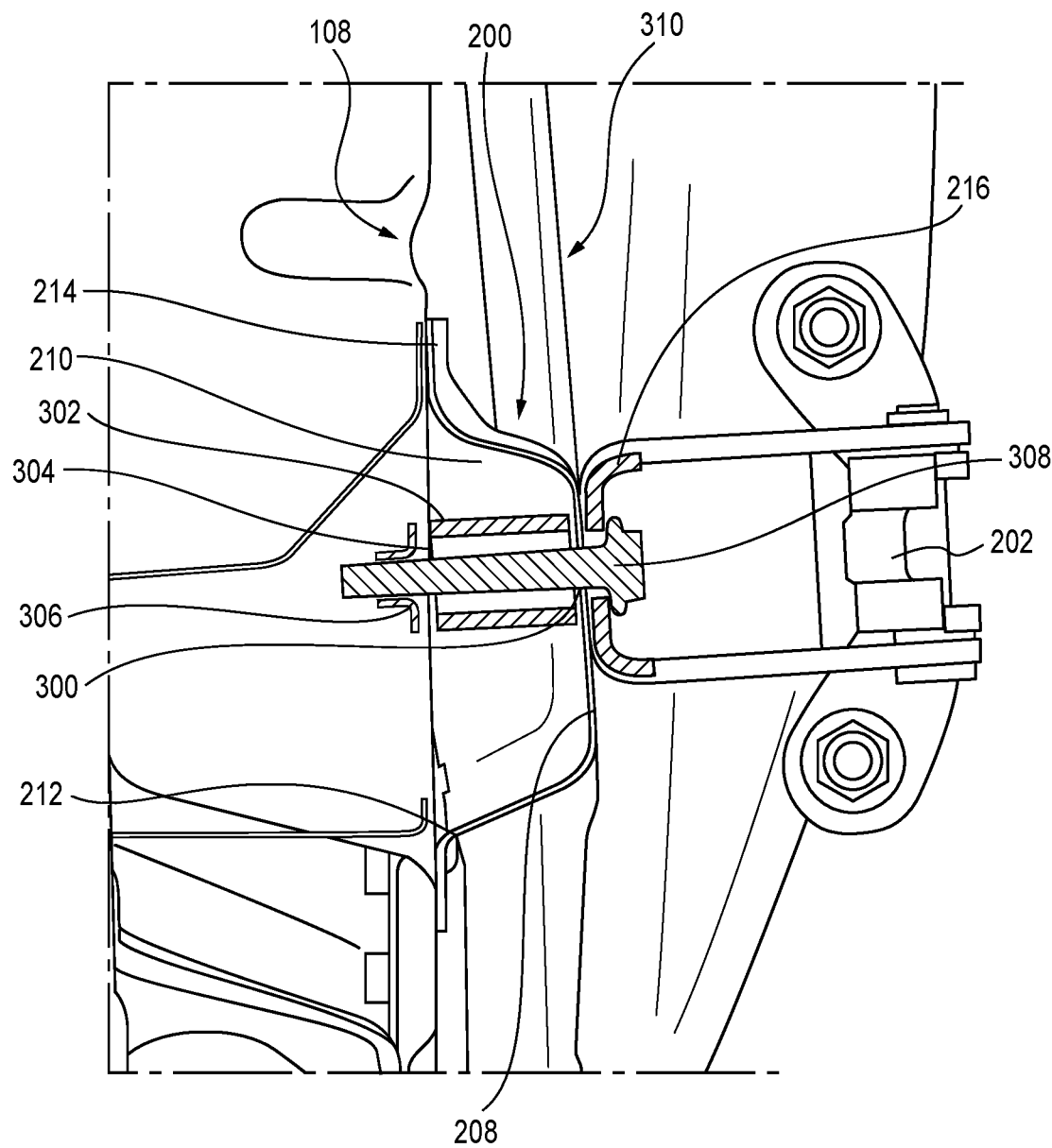
FIG. 4 is a cross-section taken along line B-B of FIG. 2.

FIGS. 2-4 illustrate the operation and construction of the standoff structure 200 associated with the center pillar 104 of the vehicle. The operation and construction of the standoff structure 204 associated with the front pillar 102 of the vehicle is same as that of the standoff structure 200 associated with the center pillar 104, and the following discussion applies to the standoff structures 200, 204 for both pillars 104, 102.

The standoff structure 200 includes a generally cup-shaped body 206 having a generally flat bottom portion 208, a sidewall portion 210 extending from the bottom portion 208, and edge 212. A flange 214 extends around the edge 212 of the cup-shaped body 206 that allows the standoff structure 200 to be attached to the outer pillar stiffener 108. The standoff structure 200 may be attached by any suitable method, such as spot welding, mechanical fasteners, or any other method known to one skilled in the art.

The bottom portion 208 of the cup-shaped body 206 includes two hinge mount bolt holes 300. Extending laterally inwardly from the bottom portion 208 are two welded on collars 302 concentric with the hinge mount bolt holes 300. The standoff structure 200 is attached, as previously discussed, to the outer pillar stiffener 108 so that the collars 302 are also concentric with two bolt holes 304 in the outer pillar stiffener 108. Plate nuts 306 are welded to the inboard side of the outer pillar stiffener 108 for receiving hinge bolts 308. The outboard side of the cup-shaped body 206 is aligned with the outer side panel 310, which is not shown in FIG. 2 for ease in illustration, but is shown in FIGS. 3-4. When a hinge mount 216 is bolted onto the standoff structure 200, the standoff structure 200 is sandwiched between the outer pillar stiffener 108 and the outer side panel 310, providing support to the door.

Figure 5:
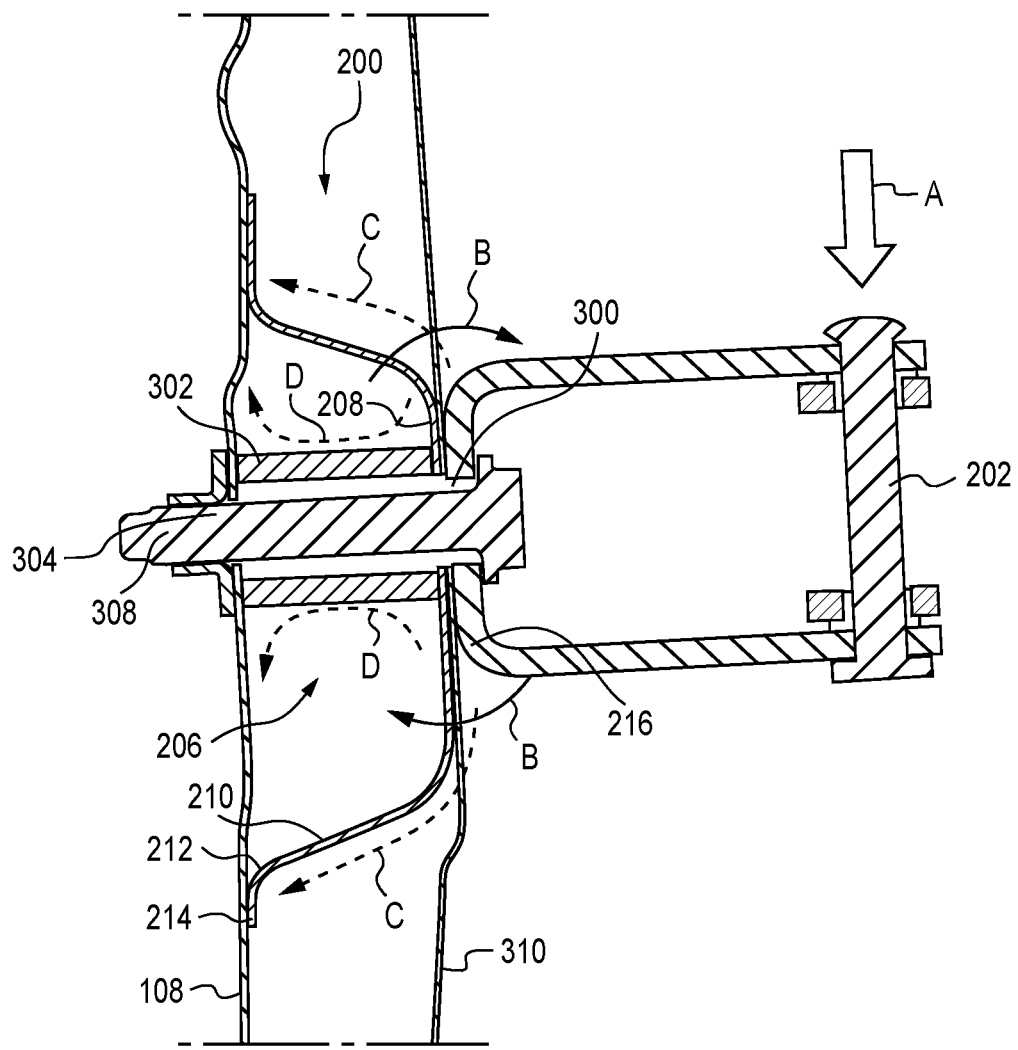
FIG. 5 is a cross-section taken along line B-B of FIG. 2 illustrating forces acting on the standoff structure and door hinge.

FIG. 5 illustrates the practical application of the standoff structure 200. The standoff structure 200 acts to distribute compressive and tensile forces caused by the gravitational force on the door and the load of the door on the door hinge 202 that is distributed through multiple load paths as illustrated in FIG. 5. By distributing the compressive and tensile forces, the standoff structures 200 limits damage to the outer pillar stiffener 108, the outer side panel 310, and the door hinge 202 caused by the compressive and tensile forces by providing multiple load paths through which the forces may be distributed. The large moment on the door hinge 202, represented by arrow B, created by the gravitational force acting on the door, represented by the solid arrow A, is distributed through the sidewall portion 210 of the standoff structure 200 and the flange 214 to the outer pillar stiffener 108, which is represented by the dashed line arrows C, and through the collars 302, which is represented by the dashed line arrows D.

Figure 6:
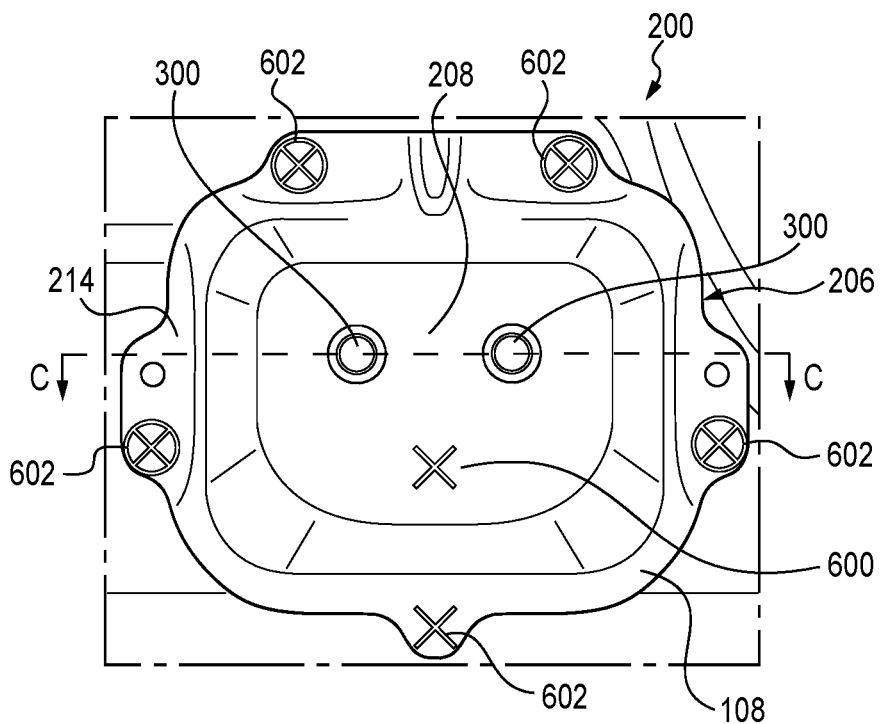
FIG. 6 is a front view of one embodiment of a door standoff structure.
Figure 7:
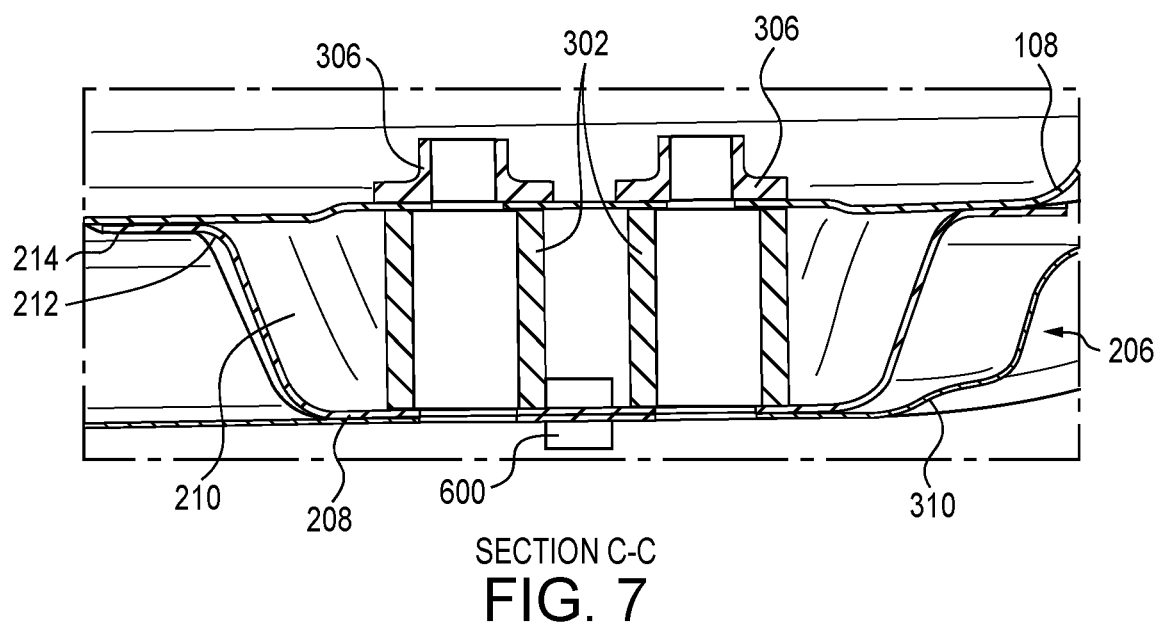
FIG. 7 is a cross-section taken along line C-C of FIG. 6.
Figure 8:
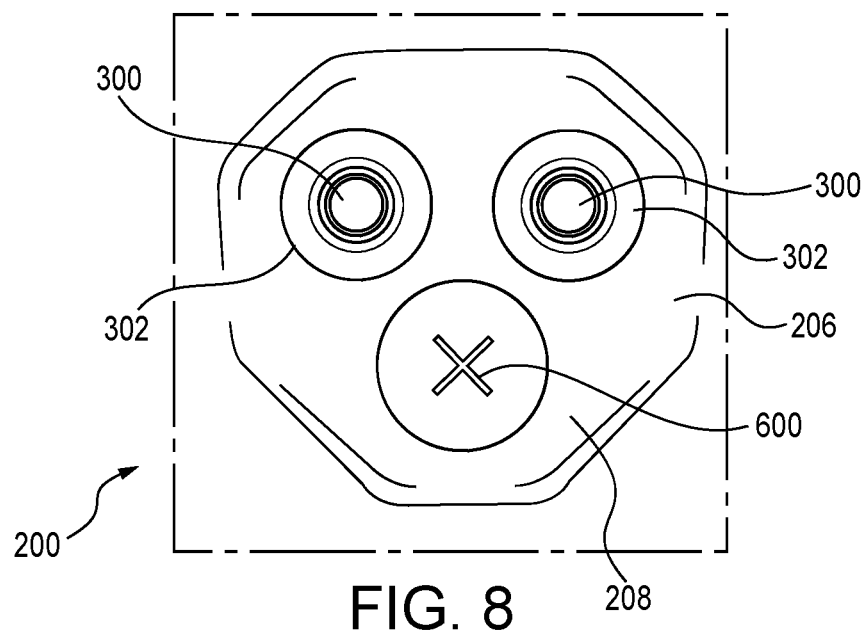
FIG. 8 is a rear view of the door standoff structure of FIG. 6 including the outer stiffener.

FIGS. 6-8 illustrate the standoff structure 200 on the outer pillar stiffener 108 of center pillar 104 in greater detail. FIG. 6 illustrates cup-shaped body 206 showing the bottom portion 208 without the hinge attached. The X on the bottom portion 208 represents the location of a spot weld 600 to attach the outer side panel 310 to the standoff structure 200. The X's on the flange 214 represent weld locations 602 to attach the standoff structure 200 to the outer pillar stiffener 108. FIG. 7 is a cross section along line C-C in FIG. 6 illustrating how portions of the flange 214 may be configured to conform to the shape of the outer pillar stiffener 108. FIG. 8 is a view of the inside of the standoff structure 200, opposite the view of FIG. 6, showing the weld collars 302 extending inward from the bottom portion 208 of the cup-shaped body 206. As in FIG. 6, the X on the bottom portion 208 represents the location of the spot weld 600 to attach the outer side panel 310 to the standoff structure 200.

Figure 9:
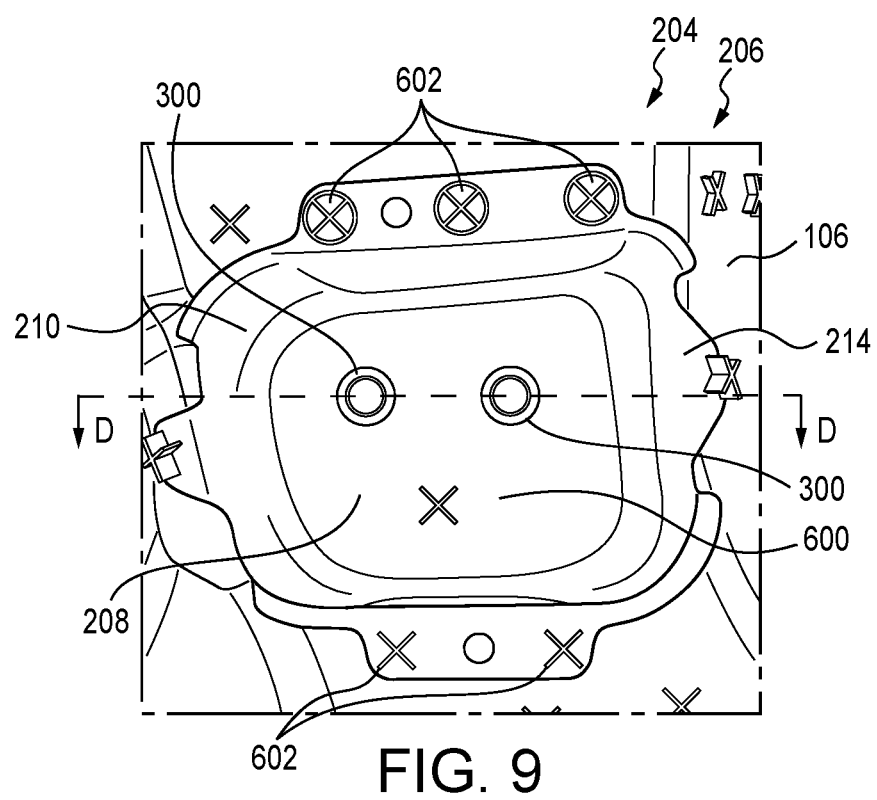
FIG. 9 is a front view of another embodiment of a door standoff structure.
Figure 10:
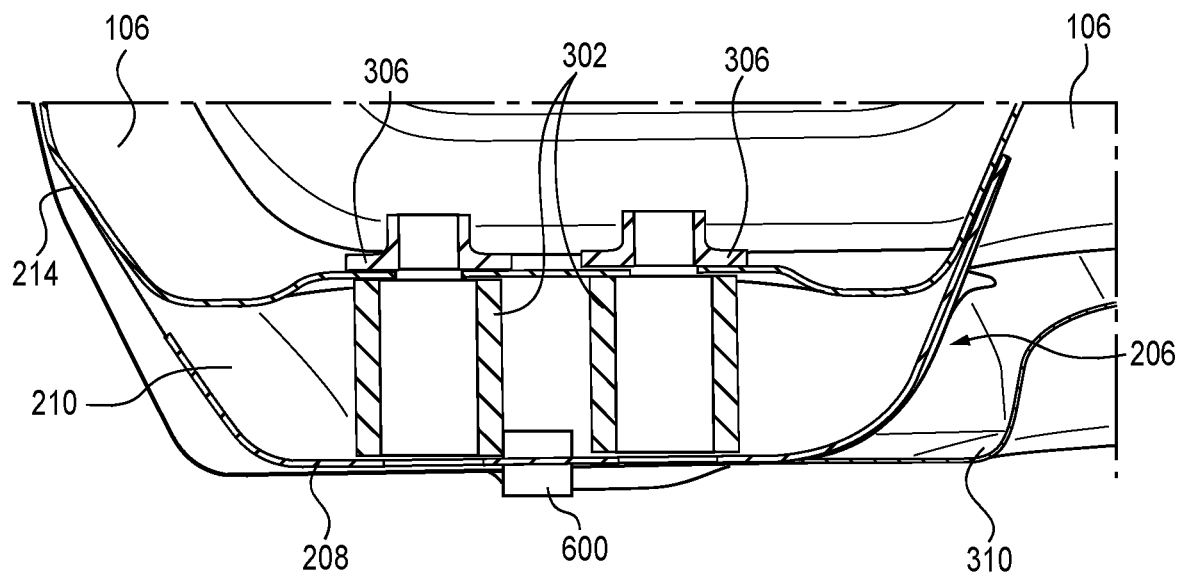
FIG. 10 is a cross-section taken along line D-D of FIG. 9.
Figure 11:
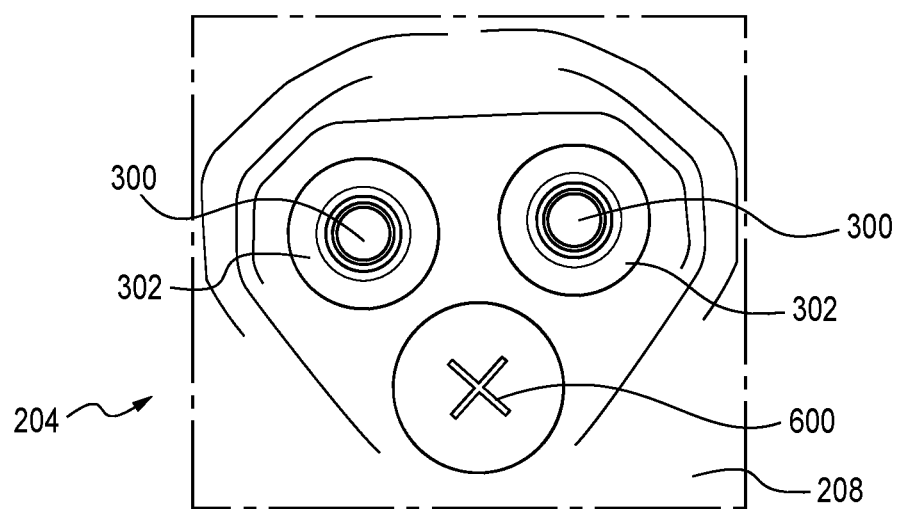
FIG. 11 is a rear view of the door standoff structure of FIG. 9 including the outer stiffener.

FIGS. 9-11 illustrate the standoff structure 204 on the outer pillar stiffener 106 of front pillar 102 in greater detail. FIG. 9 illustrates the cup-shaped body 206 showing the bottom portion 208 without the door hinge 202 attached. The X on the bottom portion 208 represents the location of a spot weld 600 to attach the outer side panel 310 to the standoff structure 204. The X's on the flange represent weld locations 602 to attach the standoff structure 204 to the front outer pillar stiffener 106. FIG. 10 is a cross section along line D-D in FIG. 9 illustrated how portions of the flange 214 may be sloped to conform to the shape of the front outer pillar stiffener 106. FIG. 11 is a view of the inside of the standoff structure 204, opposite the view of FIG. 9, showing the weld collars 302 extending inward from the bottom portion 208 of the cup-shaped body 206. As in FIG. 9, the X on the bottom portion 208 represents the location of the spot weld 600 to attach the outer side panel 310 to the standoff structure 204.

Figure 12A:
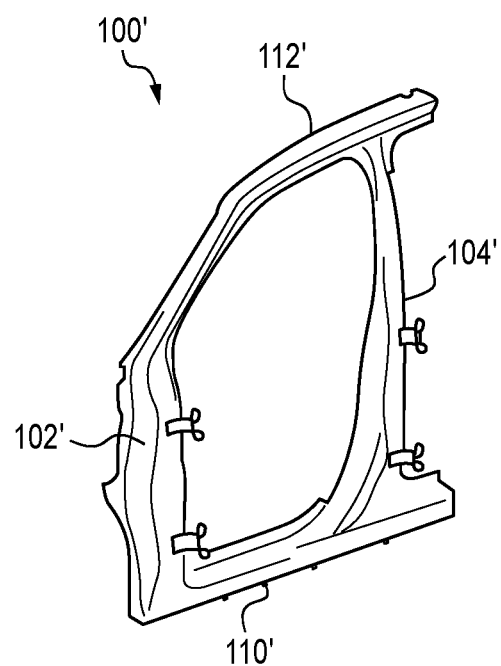
FIG. 12A is a side perspective view of a door ring of a prior art vehicle.

The standoff structures 200, 204 disclosed herein additionally improve styling freedom for the profile view of the door ring 100. FIGS. 12A-12E illustrate a prior art door ring 100' without the standoff structures 200, 204. FIGS. 12B and 12C illustrate a profile view the front pillar 102' of the door ring 100' in FIG. 12A, and FIGS. 12D and 12E illustrate a profile view of the center pillar 104' of the door ring 100' of FIG. 12A. Due to the lack of a standoff structure 200, 204, the door hinge is connected directly to the respective outer pillar stiffener 106', 108'. As illustrated in FIG. 12B, in order to have appropriate alignment with the upper door hinge 1200', the cross-section depth on the front pillar 102' is required to be deeper and more difficult to form than the ideal profile shape, illustrated by line E, while also limiting design options. As shown in FIG. 12C, the excess material 1202' that is required raises the mass of the vehicle. The same situation happens with respect to the center pillar 104', as shown in FIG. 12D. The cross-section depth is deeper than the ideal line E, and excess material 1202' is required as shown in FIG. 12E.

Figure 13A:
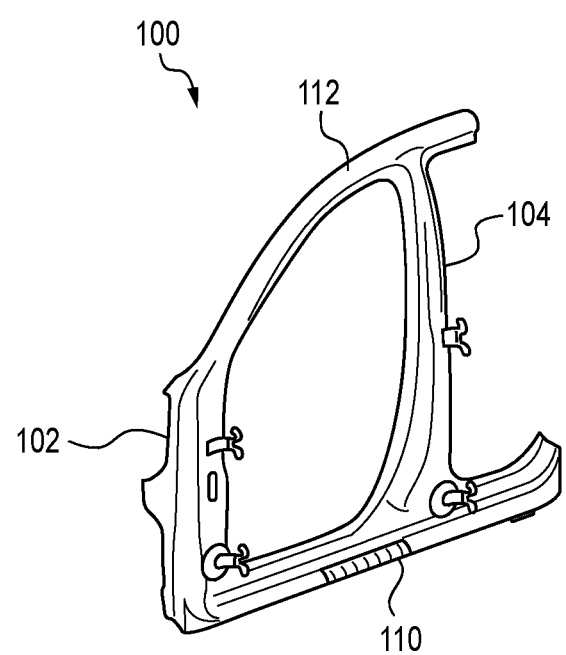
FIG. 13A is a side perspective view of a door ring of a vehicle including standoff structures.
Figure 13B:
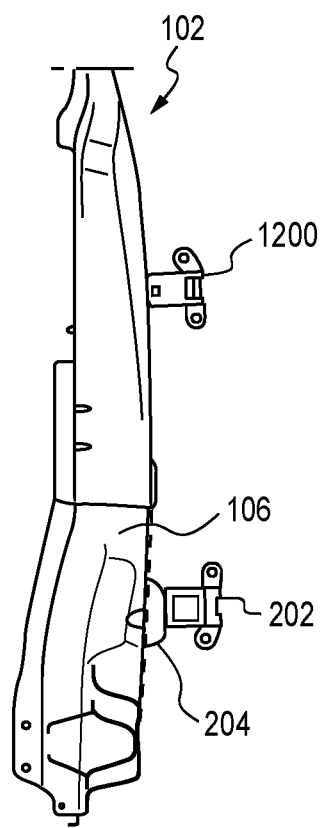
FIG. 13B is a front profile view of a front pillar of the vehicle shown in FIG. 13A.
Figure 13C:
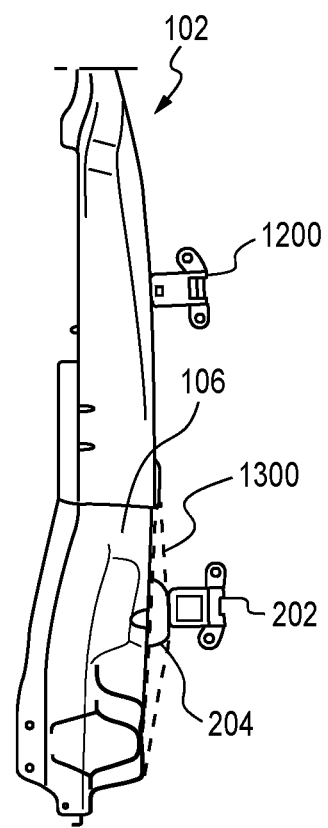
FIG. 13C is a front profile view of the front pillar of the vehicle shown in FIG. 13A showing excess material not required due to application of the standoff structure.
Figure 13D:
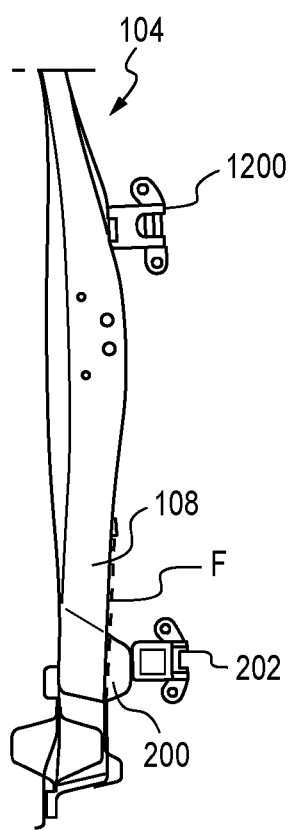
FIG. 13D is a front profile view of a center pillar of the vehicle shown in FIG. 13A.
Figure 13E:
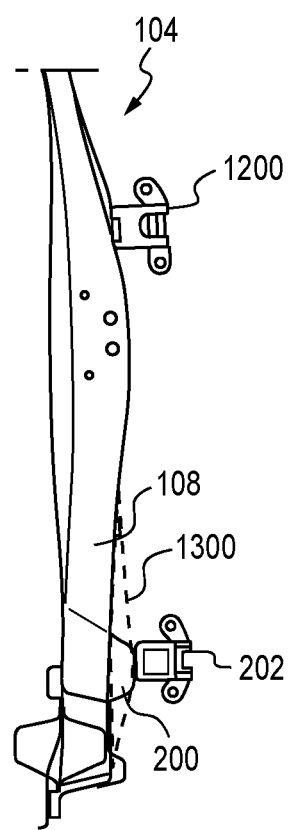
FIG. 13E is a front profile view of the center pillar of the vehicle shown in FIG. 13A showing excess material not required due to application of the standoff structure.

FIGS. 13A-13E illustrate a door ring 100 with the standoff structures 200, 204. FIGS. 13B and 13C illustrate a profile view the front pillar 102 of the door ring 100 in FIG. 13A, and FIGS. 13D and 13E illustrate a profile view of the center pillar 104 of the door ring 100 of FIG. 13A. With the standoff structures 200, 204, the door hinges 202 are not connected directly to the respective outer pillar stiffeners 106, 108. As illustrated in FIG. 13B, the standoff structure 204 gives greater flexibility in properly aligning the door hinge 202 with the with the upper door hinge 1200. Therefore, the cross-section depth on the front pillar 102 may be made to the ideal profile shape, illustrated by line F. As shown in FIG. 13C, excess material 1300 that would have been present is eliminated. The same situation happens with respect to the center pillar 104, as shown in FIG. 13D. The cross-section depth is along the ideal line F, and excess material 1300 is eliminated as shown in FIG. 13E.

By modifying the shape and depth of the standoff structure 200, 204, the cross-section depth on the pillars 104, 102 during the stamping process may be better accomplished, and the with greater design flexibility. The standoff structures 200, 204 allow for narrower platforms and wider styling without compromising the outer pillar stiffener 108, 106 geometry and support for the doors. Benefits may further apply to providing consistent side sill 110 geometry, simplified geometry for stamping, and not unnecessarily increasing pillar 102, 104 depth to properly attach the doors.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A system for attaching a door to the body of a vehicle, the body having an inner pillar stiffener, an outer pillar stiffener laterally outward from the inner pillar stiffener, and an outer panel laterally outward from the outer panel stiffener, the system comprising:
    a standoff structure located between the outer pillar stiffener and the outer panel, the standoff structure comprising:
        a cup-shaped body having a bottom portion, a sidewall portion, and an edge;
        a flange extending around the edge of the cup-shaped body;
        a first hole in the bottom portion of the cup-shaped body; and
        a first weld collar extending laterally inward from the first hole to the outer pillar stiffener, the first weld collar concentric with the first hole in the standoff structure, a first hole in the outer pillar stiffener, and a first hole in the outer panel;
    a door hinge;
    a fastener for fastening the door hinge to the standoff structure, the first fastener is receivable through the first hole in the outer panel, the first hole in the standoff structure, and the first hole in the outer pillar stiffener;
    a first plate nut for securing the first fastener to the outer pillar stiffener; and
    wherein the cup-shaped body and the first weld collar are adapted to dissipate forces created by the door on the standoff structure.

2. The system of claim 1 wherein the standoff structure further comprises:
    a second hole in the bottom portion of the cup-shaped body;
    a second weld collar extending laterally inward from the second hole to the outer pillar stiffener, the second weld collar concentric with the second hole in the standoff structure, a second hole in the outer pillar stiffener, and a second hole in the outer panel; and
    wherein the second weld collar is adapted to dissipate forces created by the door on the standoff structure.

3. The system of claim 2 further comprising:
    a second fastener for fastening the door hinge to the standoff structure, the second fastener is receivable through the second hole in the outer panel, the second hole in the standoff-structure, and the second hole in the outer pillar stiffener; and
    a second plate nut for securing the second fastener to the outer pillar stiffener.

4. The system of claim 3 wherein the flange of the standoff structure is capable of being attached to the outer pillar stiffener.

5. The system of claim 4 wherein the flange of the standoff structure is capable of being spot-welded to the outer pillar stiffener.

6. The system of claim 5 wherein the bottom portion of the standoff structure is capable of being attached to the outer panel.

7. The system of claim 4 wherein the bottom portion of the standoff structure is capable of being attached to the outer panel.

8. The system of claim 7 wherein the bottom portion of the standoff structure is capable of being spot-welded to the outer panel.

9. The system of claim 6 wherein the bottom portion of the standoff structure is capable of being spot-welded to the outer panel.

10. The system of claim 7 wherein the door is capable of being attached to the door hinge.

11. A standoff structure located between an outer pillar stiffener and an outer panel located laterally outward from the outer pillar stiffener, to which a door hinge is attached, the standoff structure comprising:
    a cup-shaped body having a bottom portion, a sidewall portion, and an edge;
    a flange extending around the edge of the cup-shaped body;
    a first hole in the bottom portion of the cup-shaped body;
    a first weld collar extending laterally inward from the first hole to the outer pillar stiffener, the first weld collar concentric with the first hole in the standoff structure, a first hole in the outer pillar stiffener, and a first hole in the outer panel; and
    wherein the cup-shaped body and the first weld collar are adapted to dissipate forces created by the door hinge on the standoff structure.

12. The standoff structure of claim 11 further comprising:
    a second hole in the bottom portion of the cup-shaped body;
    a second weld collar extending laterally inward from the second hole to the outer pillar stiffener, the second weld collar concentric with the second hole in the standoff structure, a second hole in the outer pillar stiffener, and a second hole in the outer panel; and wherein the second weld collar is adapted to dissipate forces created by the door hinge on the standoff structure.

13. The standoff structure of claim 12 wherein the flange of the standoff structure is capable of being attached to the outer pillar stiffener.

14. The standoff structure of claim 13 wherein the flange of the standoff structure is capable of being spot-welded to the outer pillar stiffener.

15. The standoff structure of claim 13 wherein the bottom portion of the standoff structure is capable of being attached to the outer panel.

16. The standoff structure of claim 15 wherein the bottom portion of the standoff structure is capable of being spot-welded to the outer panel.

17. The standoff structure of claim 12 wherein the first weld collar and the second weld collar are adapted to receive fasteners for attaching the door hinge to the standoff structure.

18. A standoff structure located between an outer pillar stiffener and an outer panel located laterally outward from the outer pillar stiffener, to which a door hinge for a door is attached, the standoff structure comprising:
- a cup-shaped body having a bottom portion, a sidewall portion, and an edge;
- a flange extending around the edge of the cup-shaped body;
- a first hole in the bottom portion of the cup-shaped body;
- a second hole in the bottom portion of the cup-shaped body;
- a first weld collar extending laterally inward from the first hole to the outer pillar stiffener, the first weld collar concentric with the first hole in the standoff structure, a first hole in the outer pillar stiffener, and a first hole in the outer panel;
- a second weld collar extending laterally inward from the second hole to the outer pillar stiffener, the second weld collar concentric with the second hole in the standoff structure, a second hole in the outer pillar stiffener, and a second hole in the outer panel;
- a first fastener for fastening the door hinge to the standoff structure, the first fastener is receivable through the first hole in the outer panel, the first hole in the standoff structure, and the first hole in the outer pillar stiffener;
- a second fastener for fastening the door hinge to the standoff structure, the second fastener is receivable through the second hole in the outer panel, the second hole in the standoff-structure, and the second hole in the outer pillar stiffener;
- a first plate nut for securing the first fastener to the outer pillar stiffener; and
- a second plate nut for securing the second fastener to the outer pillar stiffener; and
- wherein the cup-shaped body, the first weld collar, and the second weld collar are adapted to dissipate forces created by the door on the standoff structure.

19. The standoff structure of claim 18 wherein the flange of the standoff structure is capable of being attached to the outer pillar stiffener.

20. The standoff structure of claim 19 wherein the flange of the standoff structure is capable of being spot-welded to the outer pillar stiffener.

21. The standoff structure of claim 19 wherein the bottom portion of the standoff structure is capable of being attached to the outer panel.

22. The standoff structure of claim 21 wherein the bottom portion of the standoff structure is capable of being spot-welded to the outer panel.

* * * * *